(12) United States Patent
Amelchenko et al.

(10) Patent No.: US 10,841,285 B2
(45) Date of Patent: Nov. 17, 2020

(54) NETWORKED SECURITY SYSTEM

(71) Applicant: ServiceChannel.Com, Inc., New York, NY (US)

(72) Inventors: Dmitry Amelchenko, Canton, MA (US); Daniel Campbell, Brooklyn, NY (US); Steven Gottfried, Port Washington, NY (US)

(73) Assignee: ServiceChannel.Com, Inc., New York, NY (US)

( * ) Notice: Subject to any disclaimer, the term of this patent is extended or adjusted under 35 U.S.C. 154(b) by 309 days.

(21) Appl. No.: 15/136,176

(22) Filed: Apr. 22, 2016

(65) Prior Publication Data

US 2017/0310707 A1    Oct. 26, 2017

(51) Int. Cl.
*H04L 29/06* (2006.01)
*H04L 29/08* (2006.01)
*H04W 12/00* (2009.01)

(52) U.S. Cl.
CPC .......... *H04L 63/061* (2013.01); *H04L 63/062* (2013.01); *H04L 63/0853* (2013.01); *H04L 63/102* (2013.01); *H04L 67/1004* (2013.01); *H04L 63/0861* (2013.01); *H04L 63/18* (2013.01); *H04L 67/02* (2013.01); *H04L 67/10* (2013.01); *H04L 67/306* (2013.01); *H04W 12/00522* (2019.01)

(58) Field of Classification Search
CPC ...... H04L 63/20; H04L 63/10; H04L 63/0823
USPC ......................................................... 713/155
See application file for complete search history.

(56) References Cited

U.S. PATENT DOCUMENTS

| | | | | |
|---|---|---|---|---|
| 6,854,010 B1 * | 2/2005 | Christian | ............... | G06Q 10/10 709/219 |
| 2004/0129787 A1 * | 7/2004 | Saito | ...................... | G06K 19/07 235/492 |
| 2013/0086381 A1 * | 4/2013 | Thomas | ................ | H04L 9/3234 713/168 |
| 2015/0229612 A1 * | 8/2015 | Hassan | ................... | H04L 9/083 713/171 |
| 2016/0275499 A1 * | 9/2016 | Gardiner | ............ | G06K 9/00087 |

* cited by examiner

Primary Examiner — Malcolm Cribbs
Assistant Examiner — Angela R Holmes

(57) ABSTRACT

Disclosed are multi-tenant networked security systems and methods. The system includes a central server, a first user application provided on a first computing device, and a second user application provided on a second computer device, wherein the first and second computing devices are communicatively linked with the central server. The system further includes a persistent network key generated by the central server and based at least in part on a unique request identifier and a transient physical key generated by the first user application and based at least in part on the network key, wherein the network key is received by the first user application. The second user application is configured to communicate with the central server to analyze the network key and the physical key in order to verify that a user of the first user application possesses an ingress permission to an access point.

21 Claims, 7 Drawing Sheets

NETWORKED SECURITY SYSTEM

TECHNICAL FIELD

The present technology pertains to network security, and more specifically to multi-tenant networked security systems, methods and apparatus.

BACKGROUND

Networked security elements are typically provided by one or more servers in communication with users or user devices. Networked security elements often support multi-tenancy, wherein a single instance of a networked security element can service a large number of unique users or user devices without a decrease in the degree of security provided. Physical security elements, however, are generally unique to each user or user device. Consequently, it is often challenging or impossible to provide physical security elements in large-scale security systems, which can lead to a decrease in the overall degree of security provided or available. As such, there is a need to provide a multi-tenant security system capable of utilizing both networked and physical security elements without a decrease in the degree of security provided or an increase in cost and complexity of the system.

SUMMARY

Embodiments of the invention concern multi-tenant networked security systems, methods, and apparatus. In a first embodiment of the invention a system includes a central server, a first user application provided on a first computing device, wherein the first computing device is communicatively linked with the central server, and a second user application provided on a second computer device, wherein the second computing device is communicatively linked with the central server. The system further includes a persistent network key generated by the central server and based at least in part on a unique request identifier and a transient physical key generated by the first user application and based at least in part on the network key, wherein the network key is received by the first user application, and wherein the second user application is configured to communicate with the central server to analyze the network key and the physical key in order to verify that a user of the first user application possesses an ingress permission to an access point.

In one embodiment, the first computing device and the second computing device are remote from the central server and located at the access point.

In one embodiment, the second computing device obtains a copy of the physical key from the first computing device and processes the copy of the physical key to extract and transmit the network key to the central server.

In one embodiment, the system further includes one or more verified user profiles stored at the central server, the one or more verified user profiles each containing at least user identity information and one or more verified user credentials.

In one embodiment, the ingress permission to the access point is determined based on a real-time verification of a user identity, and the presence of a specified one or more of the verified user credentials for the user of the first user application.

In one embodiment, the verification of the one or more user credentials is performed independently from and prior to the real-time verification of the user identity.

In one embodiment, the central server, in response to receiving a network key, determines and transmits an associated user identity information to the second user application for the real-time verification of the user identity.

In one embodiment, the physical key is a QR code.

In one embodiment, the physical key comprises biometric data obtained from a user of the first user application.

In one embodiment, the verified user credentials comprise one or more of a background check, a licensing certification, an insurance registration, an educational or vocational degree, or an employment history.

In a second embodiment a method includes generating, by a server, a persistent network key based at least in part on a unique request identifier, transmitting, by the server, the network key to a first computing device, providing, by the server, a first application to the first computing device, the first application configured to cause the first computing device to generate a transient physical key based at least in part on the network key, and providing, by the server, a second application to a second computing device, the second application configured to communicate with the server to verify the physical key and the network key.

In one embodiment, the method further includes receiving, on the server, user identity information for a plurality of users, requesting, by the server, verification of the user identity information for each of the users, and storing, on the server, a verified user profile for each of the users, wherein each verified user profile comprises the user identity information and a status of the verification of the user identity information.

In one embodiment, the network key is based at least in part on the verified user profile stored on the server.

In one embodiment, the method further includes displaying, via the first application on the first computing device, the physical key, wherein the physical key comprises a QR code.

In one embodiment, the method further includes obtaining, via the second application on the second computing device, a copy of the physical key.

In one embodiment, verifying the physical key and the network key comprises determining an access permission of a user of the first application on the first computing device.

In one embodiment, the method further includes displaying, via the second application on the second computing device, the access permission.

In a third embodiment an apparatus includes a first user application provided on a first computing device, a second user application provided on a second computer device, and a central server communicatively coupled with the first computing device and the second computing device to receive an ingress permission policy for an access point, wherein the server is configured to verify the ingress permission policy in response to an interaction between the first computing device and the second computing device at the access point.

In one embodiment, the central server is further configured to enable a real-time verification of a user identity associated with a user of the first user application.

In one embodiment, verifying the ingress permission policy comprises validating one or more of a network key and a physical key, the network key based at least in part on a unique request identifier and the physical key based at least in part on the network key.

In one embodiment, the physical key comprises at least one of a QR code and biometric data obtained from a user of the first user application.

In one embodiment, verifying the ingress permission policy comprises validating one or more of a background check, a licensing certification, an insurance registration, an educational or vocational degree, or an employment history for a user of the first user application.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
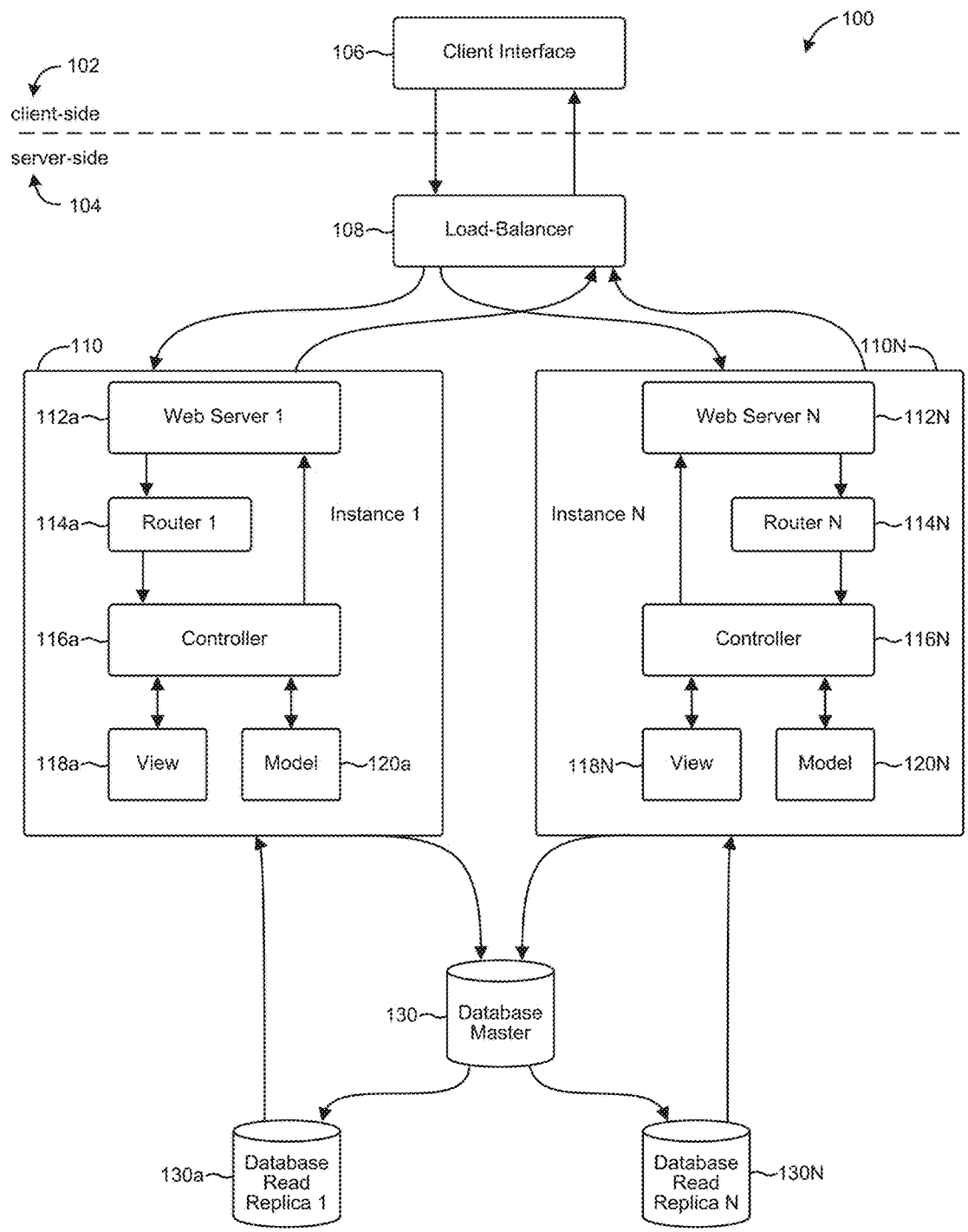
FIG. 1 illustrates a schematic diagram of an exemplary multi-tenant networked security system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As used herein, communicatively coupled is taken to mean any data transmission link between two or more computing devices or components, wired or wireless. Examples of such data transmission links include, but are not limited to, a Local Area Network (LAN), a Wide Area Network (WAN), Intranet, Internet, or any other wired or wireless networking and data transmission technologies that are known in the art.

The disclosed multi-tenant networked security system, method, and apparatus are best understood in the context of the environment in which they operate. Accordingly, FIG. 1 depicts an illustrative architecture of a multi-tenant networked security system 100. Broadly, the multi-tenant networked security system architecture may be broken down into two constituent components: a client-side 102 and a server-side 104, the separation between the two demarcated in FIG. 1 by a horizontal dashed line. In some embodiments, client-side 102 may alternately be referred to as a 'front-end' of the security system 100 and server-side 104 may alternately be referred to as a 'back-end' of the security system 100.

Client-side, or front-end, 102 consists of a client interface 106, which may be provided on one or more computing devices (not shown) that are remote from server-side 104. In some embodiments, client interface 106 may be a mobile browser, a web application, a native application, a mobile application, an Application Programming Interface, or other interface capable of enabling communication between client-side 102 and server-side 104 as would be appreciated by one of ordinary skill in the art. Various examples of client interface 106 are provided, noting that client interface 106 need not have the same appearance or functionality for all users of security system 100. For example, some users may have restricted permissions or access to certain features of client interface 106; some users may access client interface 106 via a mobile application of a mobile computing device while other users may access client interface 106 via a web application of a desktop computing device; and some users may interact with multiple instances of client interface 106 simultaneously. As will be explained further, in some embodiments, client interface 106 may be designed to support a plurality of user instances and to execute on a variety of different platforms and client computing devices without any associated loss in functionality.

Server-side 104 may be provided on one or more computer servers (not shown) that are communicatively coupled via one or more networks. The one or more computer servers may be housed in a single location or distributed over a plurality of different geographic locations and regions. In some embodiments, server-side 104 may be provided by one or more cloud computing clusters, which can provide increased performance and greater reliability by permitting each instance of server-side 104 to execute on an optimal computing resource of the cloud computing clusters.

Server-side 104 contains one or more computing instances 110a-110N, wherein N indicates the total number of computing instances. As illustrated, computing instances 110a-110N operate independently of one another, and are managed by a load-balancer 108 that is communicatively coupled to each computing instance. In some embodiments, two or more of the computing instances may be communicatively coupled or otherwise operate in cooperation with each other. Each of the computing instances 110a-110N is further coupled to a shared database 130, wherein shared database 130 may comprise one or more networked storage devices, functioning as a cohesive unit by virtue of a database controller. In some embodiments, each computing instance may be restricted to only transmit data to shared database 130, in order to provide increased security and reduce the probability of data being lost or otherwise compromised. In order to access information from shared database 130, server-side 104 may additionally contain one or more database read replicas 130a-130N, wherein each one of the database read replicas 130a-130N corresponds to a specific one of the computing instances 110a-110N. Each database read replica may be an exact duplicate of shared database 130, or each database read replica may be dynamically populated by retrieving and saving data from shared database 130 as it becomes required by the corresponding computing instance. In this manner, each of the computing instances 110a-110N may be substantially isolated both from each other and from any specific hardware or computing resource that may be subject to a failure or security breach, thereby providing an increased degree of security and reliability to security system 100.

Load-balancer 108 is communicatively coupled between client interface 106 and each of the computing instances 110a-110N, and may serve as a bridge to route all communications and data transmissions between client interface 106 and the computing instances. In some embodiments, a separate component may be provided by server-side 104 in order to route the communications and data transmissions. In order to provide increased security, all communications between client-side 102 and server-side 104 may be encrypted or otherwise secured, regardless of whether the communications are handled by load-balancer 108 or a separate component. A username and associated password may be required in order for a user of security system 100 to access client interface 106, server-side 104, or both. Other network security policies may likewise be applied to the communication link between client-side 102 and server-side 104 in order to permit unauthorized access to security system 100, as would be appreciated by one of ordinary skill in the art.

As illustrated, load-balancer 108 and the computing instances 110a-110N operate in a tiered hierarchy, wherein load-balancer 108 is provided separately from and above the computing instances 110a-110N. In some embodiments, load-balancer 108 may be provided laterally with respect to the computing instances, sharing a computing resource with a given one of the computing instances and executing in parallel, thereby allowing greater flexibility in provisioning or re-provisioning load-balancer 108.

In some embodiments, load-balancer 108 governs and controls the creation of the computing instances 110a-110N, wherein additional computing instances may be created, for example, in response to increased demand from client-side 102 or in order to achieve greater performance by increasing the ratio of computing instances to client-side requests. Load-balancer 108 may also function to distribute each incoming request from client-side 102 to a specific one of the computing instances 110a-110N in accordance with a distribution metric that may be tailored to minimize power consumption, maximize performance, or some combination of the two. In some embodiments, all requests from a specific user of client interface 106 may be transmitted to the same computing instance according to the distribution metric of load-balancer 108.

The following description is made with reference to the single computing instance 110a, but applies equally to each of the computing instances 110a-110N. As illustrated, each of the N computing instances has the same general architecture, comprising a web server 112a, a router 114a, a controller 116a, a view 118a, and a model 120a, although this illustration is not limiting and is presented in a simplified manner for purposes of clarity. As mentioned previously, a variety of different hardware solutions, such as those described with reference to FIGS. 6A and 6B, may be utilized in order to implement each of the computing instances 110a-110N, whether on dedicated servers or cloud computing clusters.

Web server 112a may be communicatively coupled with client interface 106, and may require a username and associated password to be correctly entered in order for a user of client interface 106 to be granted access. Web server 112a may store, process, and deliver web pages, applications, or other data in response to receiving a request from a user of client interface 106. Web server 112a may receive requests directly from client-side 102 and client interface 106, or may receive requests through load-balancer 108. In some embodiments, web server 112a may use HTTP or another network protocol to process the received requests and distribute data accordingly, noting that the data may be stored in shared database 130 and a database read replica 130a as described previously.

In some embodiments, computing instance 110a may employ a standard model-view-controller (MVC) software architectural pattern in order to implement a user interface, wherein the MVC architecture comprises model 120a, view 118a, and controller 116a. Model 120a and view 118a are both communicatively coupled with controller 116a, but may otherwise exist and operate independently from one another. Under the MVC architecture, a user is presented with view 118a and interacts with controller 116a. Controller 116a subsequently receives and processes the user's inputs in order to manipulate model 120a, which underlies the user interface and is used to update the view 118a presented to the user. A router 114a is communicatively coupled between web server 112a and controller 116a, and may implement a standard router functionality, directing and forwarding data packets between web server 112a and controller.

As mentioned previously, security system 100 supports multi-tenancy and furthermore may permit multiple simultaneous users that may be divided into one or more different categories. A single computing instance may simultaneously handle a number of unique users, and furthermore, may handle either an entirety or a portion of requests originating from a single given user. That is, requests originating from a single given user may be dynamically distributed over one or more computing instances based on factors such as availability, proximity, underlying hardware of the computing instance, and unique or additional security requirements. In some embodiments, the number of computing instances N may correspond directly to the number of unique users of security system 100, wherein each one of computing instances supports only a single user.

Figure 2:
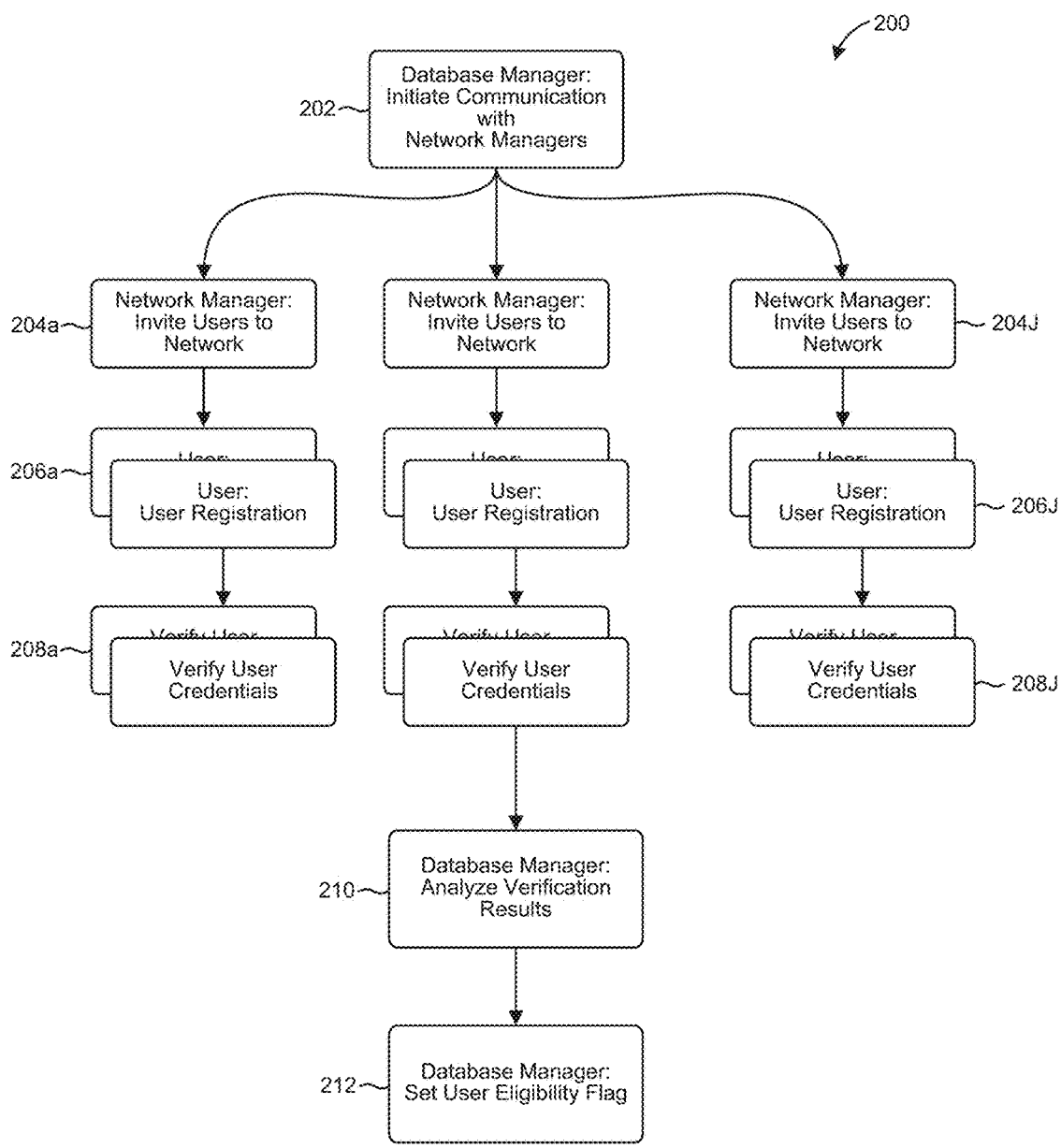
FIG. 2 illustrates an exemplary method for user interaction within the networked security system of FIG. 1.

Security system 100 may support a plurality of different users and user categories. FIG. 2 illustrates an exemplary method 200 by which end-users may interact with other users and register with the security system 100. FIG. 2 depicts three different categories of users. A Database Manager may be an entity that oversees the operation and implementation of security system 100. As such, the Database Manager may be granted a comprehensive set of top-level access permissions to the constituent components and data stored in the security system 100.

End users of the system may be divided into one or more different networks, based on a variety of different means such as, but not limited to, physical proximity, security requirements, a degree of similarity, and/or some pre-existing qualification or association. In some embodiments, a single given user may be a member of or otherwise associated with one or more different networks. Each given network may be controlled by a Network Manager, which in some embodiments is an entity responsible for registering, verifying, and otherwise managing users of security system 100. A given Network Manager may control one or more different networks. Furthermore, each given network may exist independently from security system 100 or may be generated by security system 100 as needed.

Returning to exemplary method 200, a Database Manager initiates communication with one or more Network Managers in a first step 202, wherein the communication may comprise a request to register with the security system 100. The registration request may be transmitted from server-side 104 to client-side 102, wherein a Network Manager receives the request at client interface 106 and may then complete a registration process. In some embodiments, the transmission direction may be reversed, wherein the Network Manager uses client interface 106 to transmit a registration request to server-side 104. In some embodiments, the registration request may be transmitted offline or external to the communication links between server-side 104 and client-side 102.

During the registration process, a Network Manager may upload or transmit data responsive to one or more requests from the Database Manager, and this uploaded data may be processed by one or more of the computing instances 110a-110N. One or more of the uploaded data and the processed data may be saved to shared database master 130 and stored for future use. The uploaded and processed data may include information characterizing the Network Manager, including but not limited to physical location, security requirements, security capabilities, and/or any user networks controlled by the Network Manager.

Subsequent to registering with the Database Manager, each Network Manger may invite users to register with security system 100 in a step 204a-204J, wherein J indicates the number of Network Managers having completed registration with the Database Manager. The following description is made with reference to a single Network Manager, but is extensible to the entirety of the J Network Managers, noting that the Network Managers may each execute the illustrated steps independently of one another and on a rolling basis, as user registration requests are transmitted or received.

The user invitation step 204a may comprise transmitting registration requests from server-side 104 to client-side 102, wherein a given user may receive and respond to the registration request via client interface 106. In some embodiments, the registration request may be transmitted offline or otherwise external to the communication link between server-side 104 and client-side 102. A Network Manager may transmit registration requests to all users under its control, or may transmit registration requests to only a selected portion of the users under its control. Additionally, the user registration requests may be sent simultaneously or separately in time, and may be re-transmitted if no response is received from the user after some pre-determined period of time.

Having received a registration request, in a next step 206a, each user may then register with the security system 100 using client interface 106, wherein client interface 106 can be accessed via a variety of computing devices that may be available to the user. In some embodiments, each user may additionally interact with a first user application provided on the computing device in order to complete the registration process. For example, the user application may include a web browser, a mobile application, or a native application, each of which allows the user to upload or transmit data responsive to one or more requests received from the Database Manager or the Network Manager. This uploaded data may be processed by one or more of the computing instances 110a-110N, and one or more of the uploaded data and the processed data may be saved to shared database master 130 and stored for future use. The uploaded and processed data may include information characterizing the user, including but not limited to physical location, security requirements, and security capabilities.

In some embodiments, each user may be prompted to create a User Profile, which can be tied to a specific username and password combination that allows the user to access security system 100. The User Profile may contain unique user identity information, such as a name, gender, age, social security number, a photograph, and other physically identifying information that characterizes the user. The User Profile may also contain user credentials that indicate certain qualifications associated with the user. Such qualifications may include, for example, educational degrees, vocational degrees, trade certifications and licenses, insurance, background checks, and other common qualifications. The user credentials may be uploaded to server-side 104 in photographic form, textual form, or some combination of the two. The user may be prompted by server-side 104 to enter certain user credentials if available, or may elect to upload credentials as desired. In some embodiments, the Network Manager or the user registration request may indicate a required user qualification for registration with security system 100.

Once the user has completed the user registration process, any user credentials that were transmitted to server-side 104 are verified in step 208a that confirms their legitimacy. The verification process may be conducted externally to security system 100, wherein the stored user credential is transmitted from server-side 104 to one or more third parties that are capable of performing the verification process. For example, in an instance where the user credential is a background check or a criminal history, the user's name and social security number may be transmitted to a third-party capable of providing background checks. In some embodiments, the user verification may be performed automatically and without human intervention. In some embodiments, the user verification may not be performed automatically, and the verification results may be entered into security system 100 by the Database Manager or the Network Manager, and saved in shared database master 130.

Once the verification results have been received and stored in shared database 130, the Database Manager analyzes the verification results in a step 210 in order to determine whether or not the user registration request will be accepted and if the user will be granted access to security system 100 in a subsequent step 212. For example, the verification results may be incomplete, in which case the Database Manager can prompt the user to upload additional information. In some instances, the verification results may not be presented in a binary confirmed/denied format, in which case the Database Manager analyzes the verification results against a dynamic threshold or other set of variable rules in order to determine whether or not the user registration request will be accepted. In some embodiments, the Database Manager may detect some abnormality or potential issue raised during the analysis step and save a record of this information in shared database master 130 while still allowing the user registration process to proceed, wherein the saved record is tied to the unique user profile. After the analysis step is complete, the Database Manager then sets a user eligibility flag in step 212, wherein the user eligibility flag indicates whether or not the user has been accepted into security system 100. In some embodiments, user information may be retained in shared database master 130 even if the user is not accepted into security system 100. In this case, the user information, including the User Profile, may be stored in an identical manner to that of an accepted user, although no user eligibility flag will be set. If a user is not accepted, the user may be permanently forbidden from accessing security system 100. In some embodiments, users may be eligible to re-apply and submit additional registration requests after some pre-determined waiting period. Once a user has successfully registered with security system 100 via registration method 200, the user may then fully interact with security system 100, as illustrated in FIG. 3.

Figure 3:
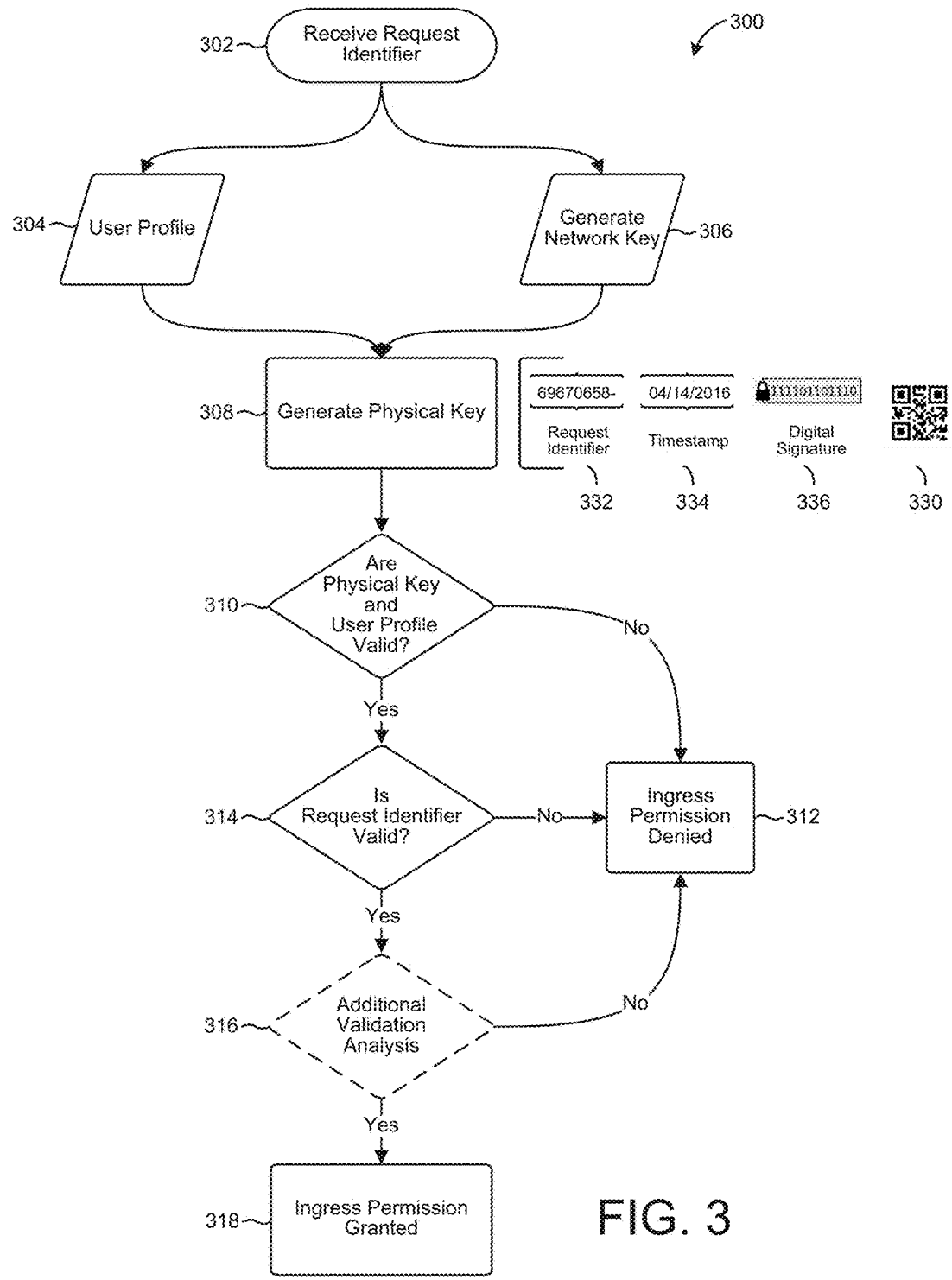
FIG. 3 illustrates an exemplary method for controlling ingress permission to an access point.

FIG. 3 depicts an exemplary process 300 in which security system 100 is used to control ingress permission to an access point. In some embodiments, the access point may be a physical location where a first user and a second user of security system 100 are both present—for example, an office or other building. In some embodiments, the access point may be a network location or node that the first user of security system 100 attempts to connect with or otherwise interact. Each access point may be associated with or controlled by a specific second user of security system 100.

In a first step 302, a unique request identifier is received at server-side 104, and may be immediately transmitted to a specific computing instance or may be stored in shared database master 130 for use at a later time. Request identifiers may originate from a Network Manager or from the second user that is associated with the access point. Request identifiers may be received in a standardized format, or may be converted to a standardized format by the Database Manager. The request identifier may be specifically linked with the first user that is seeking ingress permission to the access point, with the linkage saved in shared database master 130. This linkage may be made in a step 304, which updates the User Profile stored in shared database master 130 to include the unique request identifier. In some embodiments, more than one user may be associated with the request identifier, in instances in which the more than one user may simultaneously seek ingress permission to the access point, and each User Profile may be updated in a corresponding manner.

Once the unique request identifier is received, the computing instance generates a network key in a step 306, the network key generation step taking place subsequent to receiving the request identifier, but without time dependence on the User Profile linkage of step 304. In some embodiments, the network key itself may additionally encode the linkage between the first user and the unique request identifier. The network key may consist of an alphanumeric string or other digital key structure as would be appreciated by one of ordinary skill in the art. The network key may be generated by a processor of the computing instance, wherein the network key is based at least in part on the unique request identifier. That is, the network key generation may be deterministically based on receiving the unique request identifier as an input, wherein a given unique request identifier taken as input will yield the same unique network key every time the network key generation process is conducted. As such, each network key is persistent, existing indefinitely in security system 100 until it is actively removed from shared database 130 by the Database Manager or an automated data removal and retention policy that may be provided on shared database 130. Taken together, the User Profile and the network key can permit two-factor authentication of a first user requesting ingress permission to the access point, wherein verifying the User Profile comprises a first factor and verifying the network key comprises a second factor.

Once the network key is generated and stored in shared database master 130, a physical key is generated in a step 308, such that the physical key may be exchanged at the access point and between the first user and the second user, thereby providing an increased degree of security beyond simply the network-based two-factor authorization described above. In some embodiments, the physical key may comprise a QR code 330, wherein the QR code may be displayed on a screen of a computing device used by the first user and is generated by a processor of the same computing device. In some embodiments, the physical key may contain biometric data such as fingerprint information or iris scans obtained from the first user.

The physical key may be based at least in part on the network key, wherein the first user's computing device connects to server-side 104 of security system 100 in order to obtain the network key. Using a web browser or other application provided on the computing device to implement the functionality of client interface 106, the first user may transmit a request to generate the physical key. In response to this request, the specific computing instance running on server-side 104 transmits the network key associated with the first user and the access point to the first user's computing device. In the case where the physical key is provided by QR code 330, QR code 330 may be generated such that it directly encodes the request identifier 332 and a timestamp 334. In some embodiments, QR code may further encode the network key, or the network key and request identifier 332 may be identical. The QR code may also be secured via a digital signature 336 that is applied during the generation process. The physical key may be generated once the first user is present at the access point, or the physical key may be generated while the first user is remote from the access point. Unlike the persistent network key, the physical key may be transient and created with a pre-defined lifetime, such as 24 hours, at which point the physical key is no longer valid.

Once the physical key and network key have both been generated, the first user may continue to seek ingress permission to the access point. In a step 310, the physical key and User Profile are both validated. The second user, also connected to security system 100 via a computing device running an application capable of implementing the functionality of client interface 106, obtains a copy of the physical key from the first user's computing device. For example, the second user may use a camera to scan the QR code presented by the first user, or may use a biometric reader to obtain biometric data from the first user.

The second user may then transmit the copy of the physical key to the computing instance running on server-side 104. Recalling that the physical key is based at least in part on the network key, the computing instance may therefore process the received copy of the physical key to extract or determine the underlying network key, thereby validating that there is a pre-existing request identifier linking the first user to the access point. Once the computing instance completes the process of verifying the received copy of the physical key with the information already present in the shared database 130 of security system 100, the computing instance transmits an affirmative or negative verification result to the computing device of the second user. If the physical key verification result is negative, then ingress permission is denied in a step 312. The physical key verification result may be negative in instances where the physical key is a forgery, or otherwise not associated with any network key or unique request identifier stored in security system 100. As such, the physical key may prevent imposters from gaining ingress permission to the access point, by requiring the existence of one or more underlying and pre-existing data entries into security system 100, and therefore can offer increased levels of security.

The User Profile of the first user is also validated in the same step, wherein the computing instance is operative to transmit at least a portion of the User Profile information to the computing device of the second user. For example, the computing instance may transmit information such as the user name or the user photograph, or any other unique user identity information that permits a real-time verification of the identity of the first user to be performed at the access point. In some embodiments, the computing instance may also transmit information indicative of one or more verified user credentials possessed by the first user, wherein the one or more verified user credentials may comprise a requisite condition for being granted ingress permission to the access point. The required verified user credentials may be set in advance by the second user of the security system 100. Because the verified user credentials are verified in advance, as described previously, and in a streamlined manner external to both the second user and the access point, the ingress permission process may be performed in a much more streamlined and expeditious fashion. If either the user identity or the verified user credentials are incorrect, then the ingress permission to the access point is denied in step 312.

If the physical key and the User Profile are both successfully validated, then the request identifier is subsequently validated in a step 314. The request identifier associates the first user with the access point, providing an indication that security system 100 should anticipate the first user seeking ingress permission to the access point. As such, the validation of the request identifier may consist of the computing instance verifying that the shared database master 130 contains both the request identifier and the associated linkage with the first user and the access point. If the request identifier is not valid, or the shared database master 130 does not contain a record of either the request identifier or the associated linkage with the first user and the access point, then ingress permission is denied in step 312.

In an optional step 316, additional validation analysis may be performed, such as comparing a GPS location of the first user's computing device with an expected location based on the known GPS coordinates of the access point. The additional validation analysis may also comprise analyzing an interaction history that the first user has had with the security system 100, such as any prior instances of being denied ingress permission to one or more access points.

In a final step 318, ingress permission to the access point is granted to the first user, wherein the ingress permission may additionally contain a set of pre-defined rules that govern the permissions granted to the first user while interacting with the access point. By requiring the presence of both a physical key and a network key, wherein the two keys are inherently linked to one another, the security service 100 offers a stricter degree of control over the access point when compared to conventional approaches that may only require a single type of key. Additionally, by requiring a multi-party interaction between the first user's computing device, the second user's computing device, and the computing instance of server-side 104, it is more difficult for an individual to gain illicit access to the access point. Even if one or more components are forged or otherwise spoofed, or if any security measures at the access point itself are compromised, the pre-existing information stored in shared database master 130 provides an external level of security that is far more challenging to defeat.

Figure 4:
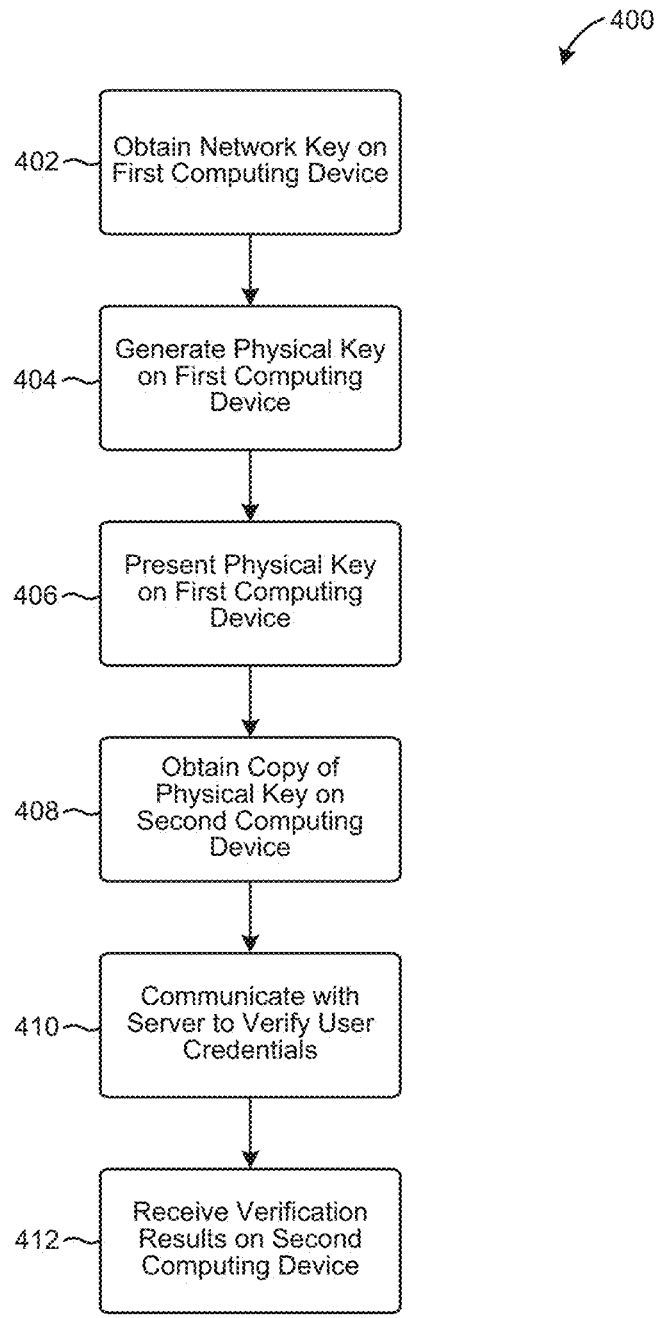
FIG. 4 illustrates an exemplary implementation of a multi-tenant networked security system.

Having described some basic system components and concepts, the disclosure now turns to a specific implementation of the present networked security system described through the exemplary method embodiment 400 shown in FIG. 4. For the sake of clarity, method 400 is described in terms of networked security system 100 as shown in FIG. 1. The steps outlined herein can be implemented in any combination thereof, including combinations that exclude, add, or modify certain steps.

Method 400 can begin at step 402 where a first computing device, such as a computing device running a web browser or other application capable of implementing the functionality of client interface 106, obtains a network key. As previously discussed, the network key can be generated by a computing instance of a server operating on server-side 104 and transmitted to the first computing device over a network. The network key may include an alphanumeric string or other digital key structure and can be based at least in part on a unique request identifier received at the server. The network key itself may additionally encode the linkage between a user of the first computing device and the unique request identifier.

At step 404, the first computing device can generate a physical key based at least in part on the network key received in step 402. The physical key can include, for example, a QR code and/or biometric data obtained from a user of the first computing device. In the case where the physical key is provided by a QR code, the QR code may be generated such that it directly encodes the network key and a timestamp. Unlike the persistent network key, the physical key may be transient and created with a pre-defined lifetime at which point the physical key expires and is no longer valid.

Figure 5A:
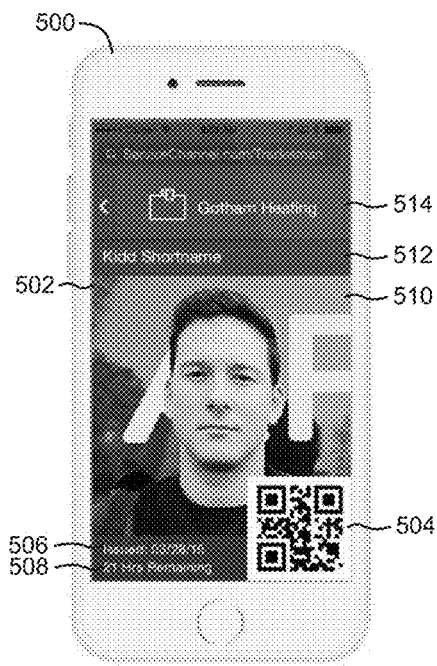
FIG. 5A illustrates a first computing device displaying an exemplary physical key.

Once generated, the physical key can be presented or displayed via the first computing device (step 406). For example, FIG. 5A depicts a first computing device 500 having a graphical user interface (GUI) 502 for displaying the physical key. It can be seen that GUI 502 displays the physical key as a QR code 504 along with an issue date 506 and a lifetime 508 of the physical key. GUI 502 can also display additional identifying information for a user of first computing device 500 such as a picture 510, a name 512, and an association 514.

Figure 5B:
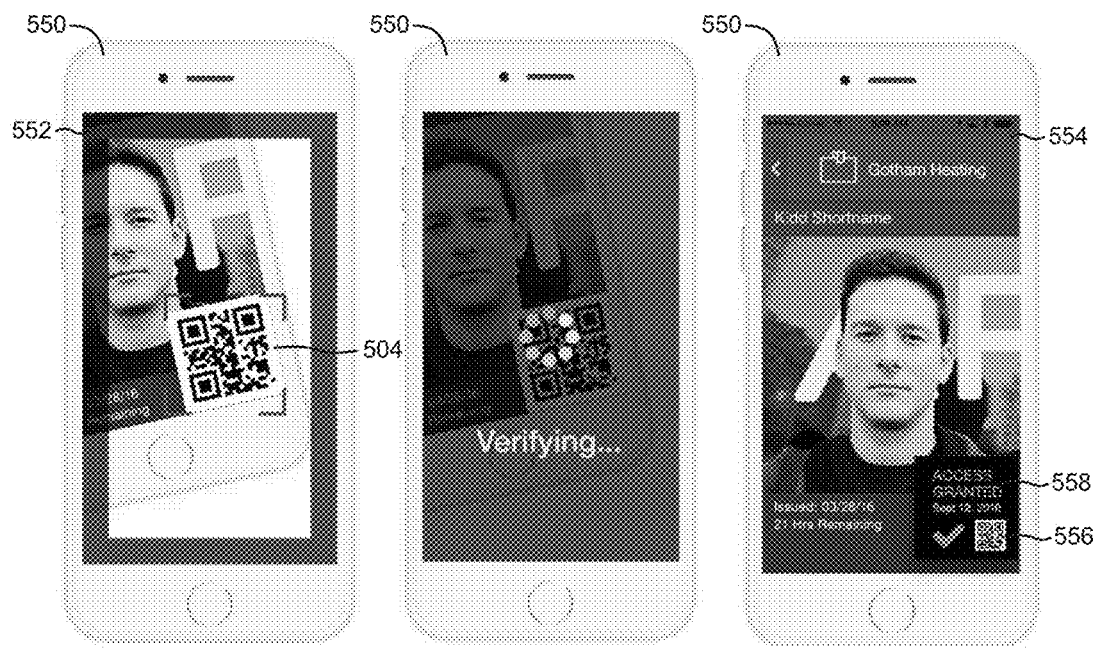
FIG. 5B illustrates a second computing device displaying an exemplary verification process.

After generating and presenting the physical key via the first computing device, a second user connected to security system 100 via a second computing device may seek to determine an ingress permission for the user of the first computing device. To do so, an application running on the second computing device can obtain a copy of the physical key from the first computing device (step 408). For example, FIG. 5B illustrates a GUI 552 in which a second computing device 550 obtains a copy of the physical key by utilizing a camera to scan QR code 504 presented on first computing device 500.

Next, at step 410, the second computing device can communicate with the server to perform a real-time verification of the credentials associated with the user of the first computing device. For example, the second computing device can transmit the copy of the physical key and/or other user credentials to the server for verification. In other cases, the second computing device can extract the underlying network key from the physical key locally and then transmit the network key and/or other user credentials to the server for verification.

Once the server completes the process of verifying the user credentials, the server can transmit a verification result to the second computing device (step 412). The verification result can subsequently be displayed on the second computing device to notify the second user whether the user of the first computing device has adequate ingress permissions to an access point. For example, FIG. 5B illustrates a GUI 554 which displays a copy of the physical key 556 and a verification result 558.

Figure 6A:
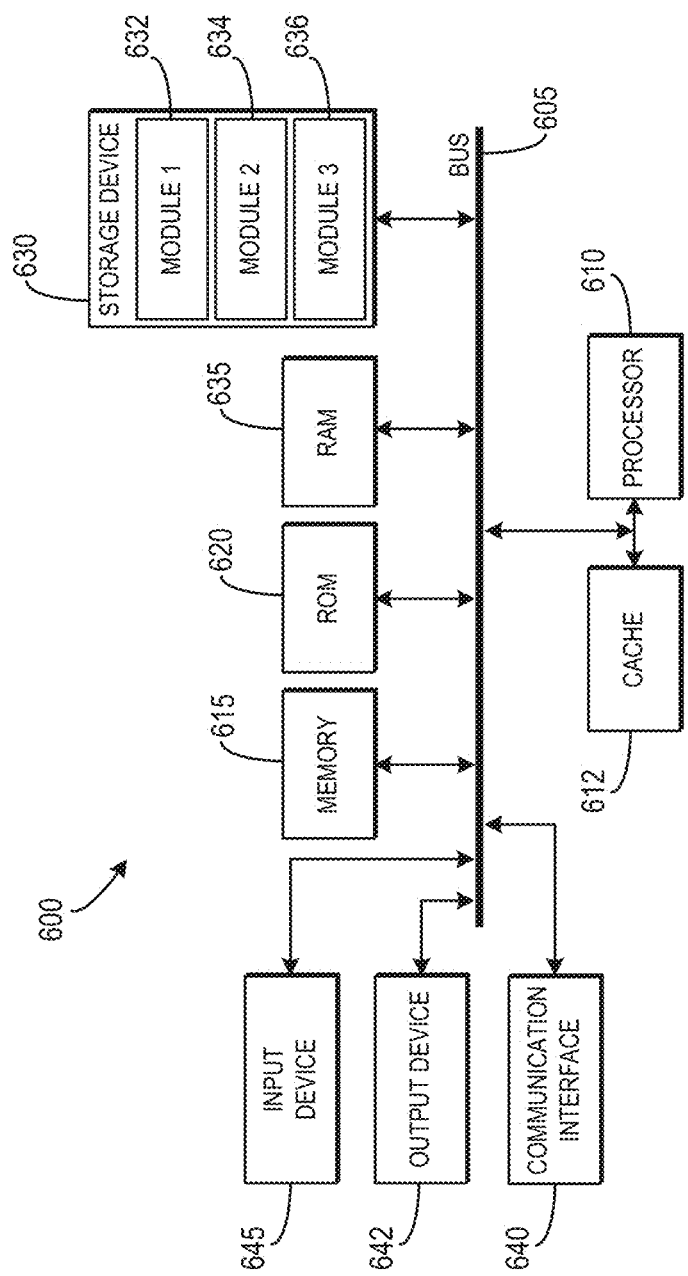
FIGS. 6A and 6B illustrate schematic diagrams of exemplary computing systems for use with the present disclosure.
Figure 6B:
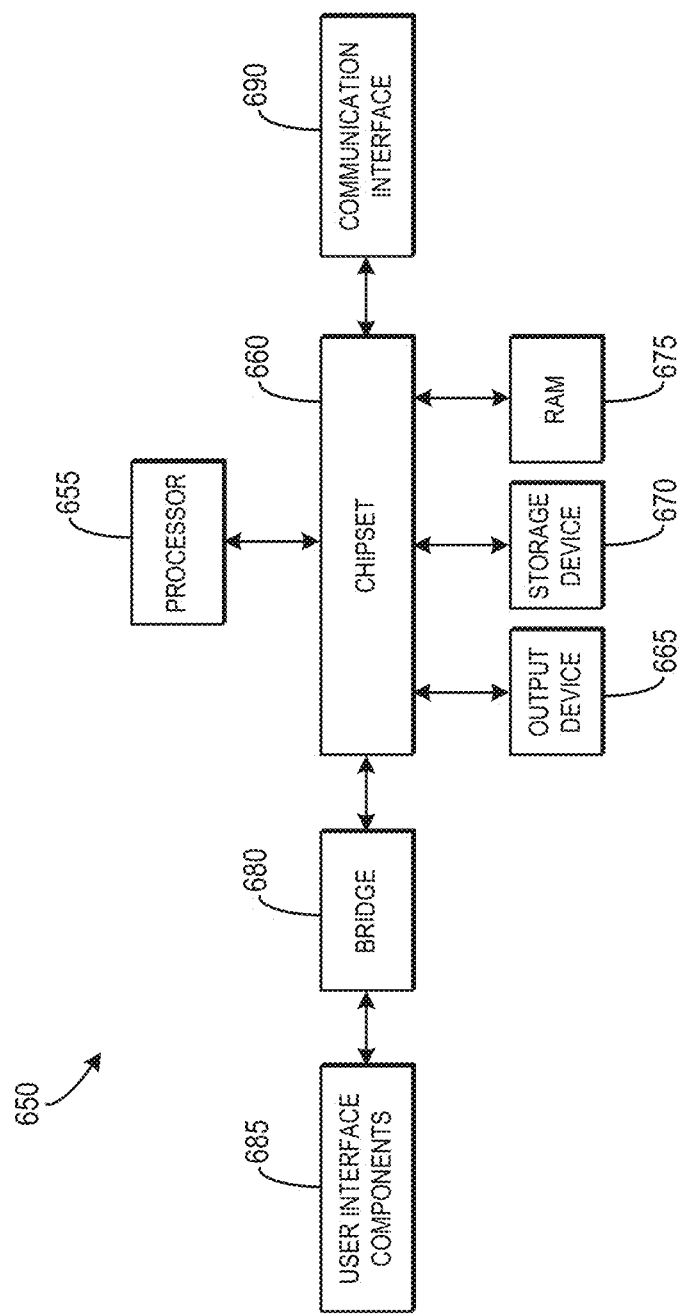

FIG. 6A and FIG. 6B illustrate example computing systems for use with example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. System 600 can include a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 (632), module 2 (634), and module 3 (636) stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 642 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 642, and so forth, to carry out the function.

FIG. 6B illustrates an example computer system 650 having a chipset architecture that can be used in executing the described method and generating and displaying a graphical user interface (GUI). Computer system 650 can be computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. Chipset 660 can output information to output device 665, such as a display, and can read and write information to storage device 670, which can include magnetic media, and solid state media. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that systems 600 and 650 can have more than one processor 610 or be part of a group or cluster of computing devices networked together to provide greater processing capability.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A multi-tenant networked security system comprising:
a central server;
a first user application provided on a first computing device, wherein the first computing device is communicatively linked with the central server;
a second user application provided on a second computer device, wherein the second computing device is communicatively linked with the central server;
a persistent network key generated by the central server and based at least in part on a unique request identifier;
a transient physical key generated by the first user application and based at least in part on the network key, wherein the network key is received by the first user application, wherein the transient physical key is generated with a pre-defined lifetime; and
an access point, wherein the second user application is configured to communicate with the central server to analyze the network key and the physical key in order to verify that a user of the first user application possesses an ingress permission to the access point.

2. The network security system of claim 1 wherein the first computing device and the second computing device are remote from the central server and located at the access point.

3. The network security system of claim 1 wherein the second computing device obtains a copy of the physical key from the first computing device and processes the copy of the physical key to extract and transmit the network key to the central server.

4. The network security system of claim 1 further comprising one or more verified user profiles stored at the central server, the one or more verified user profiles each containing at least user identity information and one or more verified user credentials.

5. The network security system of claim 4 wherein the ingress permission to the access point is determined based on a real-time verification of a user identity, and the presence of a specified one or more of the verified user credentials for the user of the first user application.

6. The network security system of claim 5 wherein the verification of the one or more user credentials is performed independently from and prior to the real-time verification of the user identity.

7. The network security system of claim 5 wherein the central server, in response to receiving a network key, determines and transmits an associated user identity information to the second user application for the real-time verification of the user identity.

8. The network security system of claim 1 wherein the physical key is a QR code.

9. The network security system of claim 1 wherein the physical key comprises biometric data obtained from a user of the first user application.

10. The network security system of claim 4 wherein the verified user credentials comprise one or more of a background check, a licensing certification, an insurance registration, an educational or vocational degree, or an employment history.

11. A networked security method, comprising:
generating, by a server, a persistent network key based at least in part on a unique request identifier;
transmitting, by the server, the network key to a first computing device;
providing, by the server, a first application to the first computing device, the first application configured to cause the first computing device to generate a transient physical key based at least in part on the network key, wherein the transient physical key is generated with a pre-defined lifetime; and
providing, by the server, a second application to a second computing device, the second application configured to communicate with the server to verify the physical key and the network key.

12. The method of claim 11, further comprising:
receiving, on the server, user identity information for a plurality of users;
requesting, by the server, verification of the user identity information for each of the users; and
storing, on the server, a verified user profile for each of the users, wherein each verified user profile comprises the user identity information and a status of the verification of the user identity information.

13. The method of claim 12, wherein the network key is based at least in part on the verified user profile stored on the server.

14. The method of claim 11, further comprising:
displaying, via the first application on the first computing device, the physical key, wherein the physical key comprises a QR code.

15. The method of claim 11, further comprising:
obtaining, via the second application on the second computing device, a copy of the physical key.

16. The method of claim 11, wherein verifying the physical key and the network key comprises determining an access permission of a user of the first application on the first computing device.

17. The method of claim 16, further comprising:
displaying, via the second application on the second computing device, the access permission.

18. A multi-tenant networked security apparatus comprising:
a first user application provided on a first computing device;
a second user application provided on a second computer device; and
a central server communicatively coupled with the first computing device and the second computing device to receive an ingress permission policy for an access point, wherein the server is configured to verify the ingress permission policy in response to an interaction between the first computing device and the second computing device at the access point, wherein verifying the ingress permission policy comprises validating one or more of a network key and a physical key, the network key based at least in part on a unique request identifier and the physical key based at least in part on the network key, wherein the physical key has a predefined lifetime.

19. The apparatus of claim 18, wherein the central server is further configured to enable a real-time verification of a user identity associated with a user of the first user application.

20. The apparatus of claim 18, wherein the physical key comprises at least one of a QR code and biometric data obtained from a user of the first user application.

21. The apparatus of claim 18, wherein verifying the ingress permission policy comprises validating one or more of a background check, a licensing certification, an insurance registration, an educational or vocational degree, or an employment history for a user of the first user application.

* * * * *